Jan. 7, 1936.  D. F. LYMAN  2,026,984
FILM MAGAZINE
Filed Dec. 7, 1933
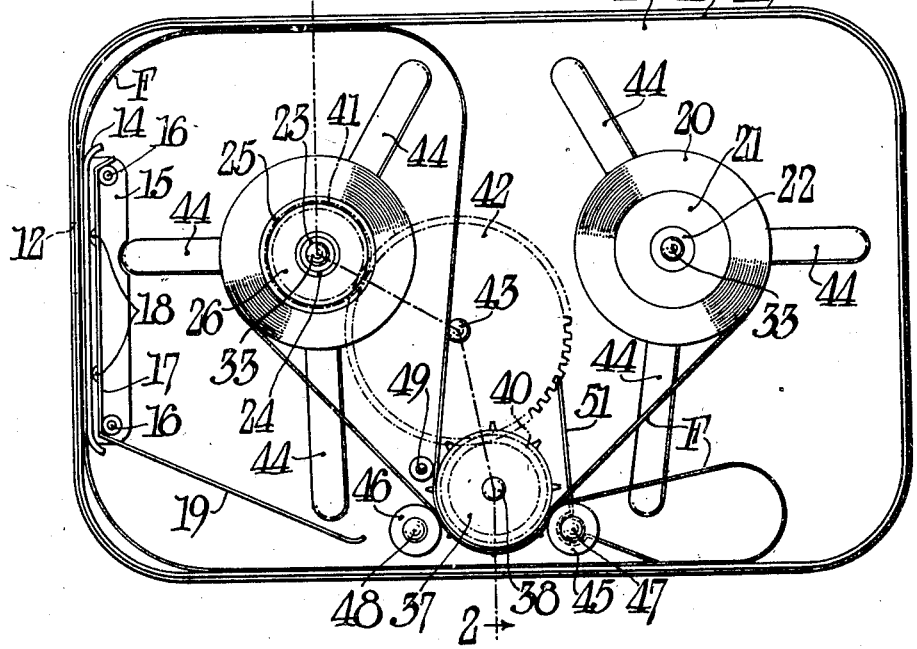
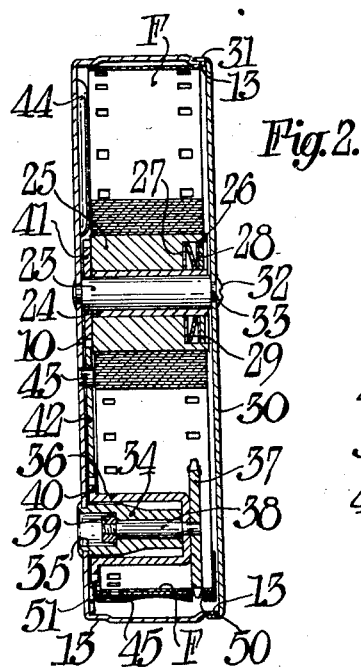
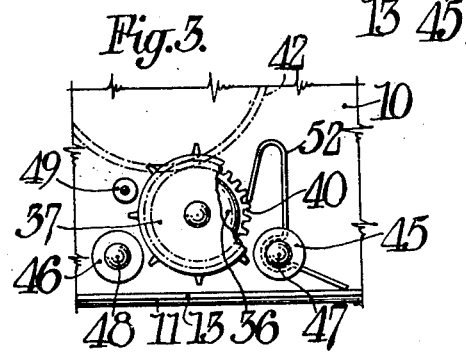
Inventor:
Donald F. Lyman,
By George A. Gillette, Jr.
Attorneys Patented Jan. 7, 1936

2,026,984

UNITED STATES PATENT OFFICE 2,026,984

FILM MAGAZINE

Donald F. Lyman, Rochester, N. Y., assignor to Eastman Kodak Company, Rochester, N. Y., a corporation of New York Application December 7, 1933, Serial No. 701,311

11 Claims. (Cl. 88—17)

The present invention relates to a film magazine and more particularly to a uni-directional clutch means for a film sprocket within a film magazine.

Considerable difficulty is encountered in the operation of film magazines because the film loops may be reduced or lost on account of movement of the film rolls due to the inherent resiliency in the film rolls and the vibrations received during shipment or interchanging of magazines. Such difficulties have previously been overcome by the provision of holding means for the spindles or film rolls or by the provision of detents which engage the film perforations. In all cases, however, the holding means or detents must be disengaged either manually or automatically upon insertion of the magazine into the camera, thereby complicating the construction or operation of the camera and magazine.

The primary object of the present invention is the provision in a film magazine containing a film sprocket of a uni-directional clutch means which is in continuous and operative relation to said sprocket for preventing undesired rotation thereof.

Another object of the invention is the provision in a film magazine containing a film sprocket and a pair of film rolls of a one-way clutch means in co-operative relation to said film sprocket and permitting rotation of said sprocket and film rolls in a predetermined direction but continuously and immediately effective to prevent rotation of said sprocket and film rolls in a reverse direction.

A further object of the invention is the provision in a film magazine containing a film sprocket and a pair of film rolls of a gear drive between said sprocket and one of said rolls and of a detent which is in continuous and operative relation to one of the gears in said gear drive to prevent rotation of said film roll and said sprocket but permitting rotation thereof in the desired direction.

Other objects of the invention will be suggested to those skilled in the art by the following disclosure.

The aforementioned and other objects of the invention are embodied in a film magazine containing a film sprocket and a uni-directional clutch means which co-operates with said sprocket to permit rotation in one direction but not in the reverse direction. Preferably the clutch means is constituted in part by one of the gears of a drive between the film sprocket and the take-up film roll.

Reference is hereby made to the accompanying drawing in which similar reference characters designate similar elements and in which:

Fig. 1 is a side elevation of an open film magazine which is equipped with the preferred form of uni-directional clutch means.

Fig. 2 is a vertical cross-section of the film magazine taken on the line 2—2 of Fig. 1.

Fig. 3 is a fragmentary elevation of a film magazine and illustrates a modified form of the clutch means of the invention.

Fig. 4 is a vertical cross-section through a film sprocket which is equipped with still another form of uni-directional clutch means.

The present invention may be advantageously employed on any type of film magazine containing a sprocket.

The casing of the magazine has a side wall 10 and an edge wall 11 which extends around the side wall 10. Off-set portions 13 are provided along the margins of edge wall 11, are best illustrated in Figs 2 and 4, and are adapted to engage the perforated margins of the film and hold the central portions of the film away from the edge wall 11.

The filmgate may be formed in the magazine and may include an exposure aperture 12 which is provided in edge wall 11 and a pressure member 14 which holds the film F against the exposure aperture 12 and which is resiliently pressed against said film F. The resilient mounting for pressure member 14 may comprise a plate 15 on side wall 10, a pair of tapered pins 16 extending from plate 15, and a spring member 17 which has embossings 18 pressing against the back of pressure member 14 and which has a tail 19 for preventing buckling of the film along the lower wall of the magazine.

The film supply includes a supply film roll 20 which is wound on a core 21 and a supply spindle 22 which is supported by side wall 10 and which rotatably supports core 21. The film take-up may comprise a spindle 23 which is riveted to side wall 10, a sleeve 24 which is rotatably supported by spindle 23, a core 25, mounted on but rotatable with respect to sleeve 24, and a frictional connection between sleeve 24 and core 25. Said frictional connection may be located within a recess in one end of core 25 and may include a disc 26 attached to sleeve 24, a friction washer 27 on disc 26, a friction washer 28 on core 25, and a dished spring 29 between said friction washers 27 and 28.

A cover 30 has a flange 31 which co-operates with the off-set portion 13 along the rim of side wall 11 to form a light-tight casing. The cover 30 is securely held in position by a pair of screws 32 which engage threaded holes 33 in the ends of spindles 22 and 23 and which hold the cover against the ends of said spindles.

The construction of the film sprocket is optional but the form here disclosed is particularly designed for ease of assembly. Such a film sprocket includes a bushing 34 which is fastened to side wall 10 and which has a recess 35, includes a cap 36 and a toothed disc 37 on a shaft 38 which extends through bushing 34, and includes a nut 39 which is threaded to shaft 38 and which has a toothed periphery for engagement with an appropriate camera part, not shown.

A driving means is arranged between the film sprocket and the take-up. Such a driving means includes a plurality of gears, one such gear 40 is formed by providing teeth on the rim of cap 36, a pinion gear 41 is fastened to the sleeve 24 of the take-up, and a pinion gear 42 is rotatably mounted on side wall 10 by a stud 43 and meshes with gears 40 and 41. Thus upon rotation of the film sprocket in a clockwise direction as viewed from Fig. 1, the take-up core 25 will also be rotated in a clockwise direction through the gear train including gears 40, 42 and 41. The peripheral speed of the film sprocket remains constant while the peripheral speed of the take-up roll increases as the diameter and the frictional connection in the end of core 25 will permit the necessary slip so that both peripheral speeds remain constant, even as the take-up roll builds up.

In order to provide clearance between the driving gears and the edges of the film and in order to minimize the friction between the film edges and side wall 10, a plurality of embossings 44 are formed in side wall 10. These embossings 44 are deeper than the width of gears 40, 41 and 42, and are preferably rounded so that line contact with the edges of the film is approximated.

A suitable guiding means is arranged adjacent the film sprocket and maintains the film perforations in engagement with the teeth of the film sprocket. Such a guiding means may consist of a pair of rollers 45 and 46 mounted on spindles 47 and 48 which are fastened to side wall 10 and a stud 49 also mounted on side wall 10. The rollers 45 and 46 are each provided with a groove 50 which receives the ends of the teeth on the film sprocket.

The film may extend through the magazine in any suitable or well known path. The film F may extend from the supply film roll 20, around the film sprocket, in preformed loops which encircle the take-up, again around the film sprocket to form a double layer thereon, and thence to the take-up. Under conditions of normal operation the film F is unwound from the supply film roll 20 upon rotation of the film sprocket in a predetermined direction, which according to the illustrated embodiment is a clockwise direction as seen in Fig. 1.

Due to the inherent resiliency of film, a film roll has a tendency to unwind in a manner very similar to that of a spring motor. This tendency will exert a force on the film sprocket in a direction opposite to the normal rotation of the film sprocket and is increased by vibrations or jars which occur during shipment or interchange of the magazine. If such reverse rotation of the film sprocket is permitted the film loops on opposite sides of the film gate will be increased or decreased until one of the loops is lost and the intermittent advancement of the film through the loops is seriously affected. Therefore, according to the present invention, a uni-directional or one-way clutch means is associated with said film sprocket in such relation that the film sprocket may be rotated or driven in a predetermined direction for advancement of the film but can not be rotated in the opposite direction. Furthermore, such a uni-directional clutch means is continuously in operative relation to the film sprocket so that normal or automatic actuation of said clutch is not necessary to place the clutch in proper condition depending on whether the magazine is inside or outside of the camera.

The uni-directional clutch means may be provided by any one of several appropriate constructions, three of which are disclosed herein. The preferred form is illustrated in Fig. 1 while two other modifications are shown respectively in Figs. 3 and 4.

In the preferred form, see Fig. 1, the one-way clutch is composed of a spring 51 which may be attached to spindle 47, which has an end bearing on the off-set portion 13 of the edge wall 11, and which has the other end engaging the teeth of pinion gear 42. Rotation of the film sprocket in a clockwise direction causes rotation of gear 42 in a counter-clockwise direction with the end of spring 51 riding on the teeth of gear 42. The tension in spring 51 is as small as is consistent with reliable operation, so that the power required to drive the magazine is not materially increased. Rotation of the film sprocket in a counter-clockwise direction under the influence of film resiliency or vibrations is prevented by the spring 51, the end of which abuts the sides of the teeth on gear 42 to prevent reverse rotation thereof. In the interest of accuracy, it is pointed out that the clutch means is composed of two elements, gear 42 and spring 51, so that the gear 42 performs a dual function as a gear and as one member of the clutch means.

The modified form of clutch means shown in Fig. 3 includes a detent composed of a spring 52 which is snapped onto spindle 47, which has one end bearing on the off-set portion 13 of side wall 11, and which has the other end doubled back to ride on the teeth of the gear 40 on the rim of cap 36. In this modification the gear 40 performs the dual function of being one member of a gear train and one element of the clutch means.

In another modification, the uni-directional clutch means, see Fig. 4, comprises a sleeve 36' which is attached internally to cap 36 and which is equal in diameter to the adjacent portion of bushing 34, and comprises a coil spring 53 which encircles sleeve 36' and the adjacent portion of bushing 34. The spring 53 is coiled in such a direction that upon rotation of the film sprocket in a predetermined direction the spring 53 will slide on sleeve 36' and bushing 34 but rotation in the opposite direction is prevented by the binding of said spring 53 on said sleeve 36' and the adjacent portion of bushing 34.

Incidentally this blocking of the film sprocket to prevent rotation in other than the predetermined direction is transmitted through the film to block the film rolls and is transmitted through the gear train to prevent rotation of the take-up roll except as limited by the friction in the frictional connection of the take-up.

Since many modifications of the present invention are possible, without departing from the essence of the invention, the present disclosure is to be construed in an illustrative sense. The scope of the invention is defined in the appended claims.

Having now particularly described my invention, what I desire to secure by Letters Patent of the United States and what I claim is:

1. In a film magazine, the combination with a casing, a pair of supports for rotatably mounting a pair of film rolls within said casing, and a film advancing means including a sprocket rotatable in a predetermined direction to move film from one film roll to the other and for engaging the film and maintaining a preformed loop in said film within said casing, of a uni-directional clutch means between said casing and said sprocket and for permitting rotation thereof in said predetermined direction but preventing rotation of said sprocket in reverse direction.

2. In a film magazine, the combination with a casing, a pair of supports for rotatably mounting a pair of film rolls within said casing, and a film advancing means including a sprocket rotatable in a predetermined direction to move film from one film roll to the other and for engaging the film and maintaining a preformed loop in said film within said casing, of a uni-directional clutch means between said casing and said sprocket and including a spring member for permitting rotation of said sprocket in said predetermined direction but preventing reverse rotation thereof.

3. In a film magazine, the combination with a casing, a film roll rotatably mounted within said casing, and a film sprocket for maintaining a preformed loop of film within said casing and rotatable in a predetermined direction to unwind the film from said film roll, the inherent resiliency of said film roll tending to rotate said sprocket in the opposite direction, of a uni-directional clutch means between said casing and said film sprocket and permitting rotation of said sprocket in said predetermined direction but preventing rotation of said sprocket in the opposite direction.

4. In a film magazine, the combination with a casing, a film roll rotatably mounted within said casing, and a film sprocket for maintaining a preformed loop of film within said casing and rotatable in a predetermined direction to unwind the film from said film roll, the inherent resiliency of said film roll tending to rotate said sprocket in the opposite direction, of a uni-directional clutch means attached to said casing and continually in co-operative relation to said sprocket and permitting rotation of said sprocket in said predetermined direction but preventing rotation of said sprocket in the opposite direction.

5. In a film magazine, the combination with a casing, a film roll rotatably mounted within said casing, and a film sprocket for maintaining a preformed loop of film within said casing and rotatable in a predetermined direction to unwind the film from said film roll, the inherent resiliency of said film roll tending to rotate said sprocket in the opposite direction, of a uni-directional clutch means attached to said casing and continually engaging said film sprocket and permitting rotation of said sprocket in said predetermined direction but preventing rotation of said sprocket in the opposite direction.

6. In a film magazine, the combination with a casing, a film roll rotatably mounted within said casing, and a film sprocket for maintaining a preformed loop of film within said casing and rotatable in a predetermined direction to unwind the film from said film roll, the inherent resiliency of said film roll tending to rotate said sprocket in the opposite direction, of a uni-directional clutch means attached to said casing and continuously in co-operative relation to said sprocket, for permitting rotation of said sprocket in said predetermined direction, and immediately effective to prevent rotation of said sprocket in the opposite direction.

7. In a film magazine, the combination with a casing, a film roll rotatably mounted within said casing, and a film sprocket for maintaining a preformed film loop within said casing and rotatable in a predetermined direction to unwind the film from said film roll, the inherent resiliency of said film roll tending to rotate said sprocket in the opposite direction, of a uni-directional clutch means attached to said casing and continuously engaging said film sprocket, permitting rotation of said sprocket in said predetermined direction and immediately effective to prevent rotation of said sprocket in the opposite direction.

8. In a film magazine, the combination with a casing, a film roll rotatably mounted within said casing, a film sprocket for maintaining a preformed film loop within said casing and rotatable in a predetermined direction to unwind film from said film roll, and a plurality of gear teeth on said sprocket, of a pinion gear rotatably mounted and meshing with the gear teeth on said sprocket, and a detent in continuous engagement with said pinion gear, for permitting rotation of said pinion gear in a direction corresponding to the predetermined rotational direction of said sprocket and for preventing the rotation of said pinion gear in the opposite direction.

9. In a film magazine, the combination with a casing, a film roll rotatably mounted within said casing, a film sprocket for maintaining a preformed film loop within said casing and rotatable in a predetermined direction to unwind film from said film roll, and a plurality of gear teeth on said sprocket, of a detent in continuous engagement with the gear teeth on said sprocket, for permitting rotation of said sprocket in said predetermined direction and for preventing rotation of said sprocket in the opposite direction.

10. In a film magazine, the combination with a casing, a film roll rotatably mounted within said casing, a support mounted within said casing and having a cylindrical portion, and a film sprocket mounted on said support to rotate in a predetermined direction for unwinding film from said film roll and having a cylindrical portion which is coaxial with the cylindrical portion on said support, of a coil spring encircling both of said cylindrical portions and coiled to permit rotation of said sprocket with respect to said support in said predetermined direction and to prevent rotation of said sprocket in the opposite direction.

11. In a film magazine, the combination with a casing, a supply film roll and a take-up film roll both rotatably mounted within said casing, a film sprocket for maintaining a preformed film loop within said casing and rotatable in a predetermined direction to unwind film from said supply film roll, and a driving means including a plurality of gears between said sprocket and said take-up film roll, of a detent in continuous engagement with one of said gears and for permitting rotation of said sprocket in said predetermined direction and preventing rotation thereof in an opposite direction.

DONALD F. LYMAN.